Patented Aug. 20, 1946

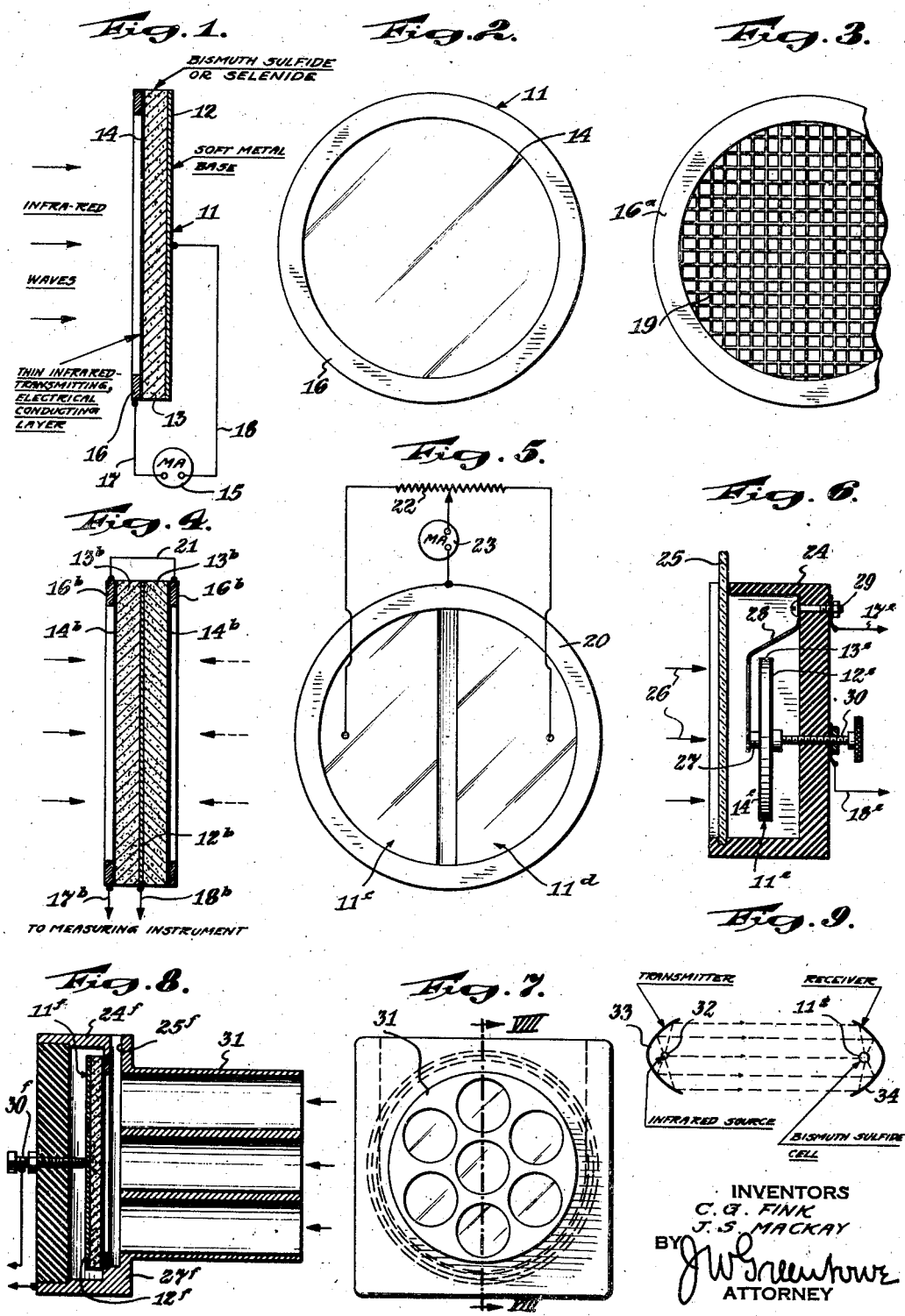

2,406,139

UNITED STATES PATENT OFFICE 2,406,139

PHOTOCELL FOR MEASURING LONG WAVE RADIATIONS

Colin G. Fink, New York, N. Y., and Johnstone S. Mackay, Prospect Park, Pa.

Application February 27, 1941, Serial No. 380,868

7 Claims. (Cl. 136—89)

This invention relates to photoelectric cells, and more particularly to such for measuring long wave or infrared radiations.

The principal object of our invention, generally considered, is the production of a photocell comprising a solid photo-element, bismuth sulfide, bismuth selenide, or equivalent, which is adapted to efficiently measure infrared rays including those of relatively long wave lengths.

Another object of our invention is the production of a photocell employing an element which has a large proportion or nearly all of this activity due to infrared radiations.

A further object of our invention is to develop a photocell which efficiently responds to infrared radiation, as by developing as much as five microamperes per lumen, or the equivalent in microwatts, of energy received.

A still further object of our invention is the employment of bismuth sulfide for measuring infrared radiations to 70,000 Angstrom units, with only a small response to visible radiations and those of shorter wave length.

Other objects and advantages of the invention, relating to the particular arrangement and construction of the various parts, will become apparent as the description proceeds.

Referring to the drawing illustrating our invention:

Figure 1 is a transverse sectional view of a simple form of photoelectric cell embodying our invention.

Figure 2 is a face view of the cell looking from the left in Figure 1.

Figure 3 is a view of a cell, such as shown in Figure 2, embodying a grid for increasing the conductivity of the photosensitive layer.

Figure 4 is a view of a cell, such as shown in Figure 1, the photosensitive portion of which is, however, duplicated on the back so that it is adapted to receive radiations from both sides.

Figure 5 is a face view of a cell, such as shown in Figure 2, except that it is of the null reading or compensating type.

Figure 6 is a view showing how a cell, such as illustrated in Figure 1, may be adjustably mounted in position and associated with a filter.

Figure 7 is an elevational view of the combination of a cell, embodying our invention, with a directional shield.

Figure 8 is a vertical sectional view on the line VIII—VIII of Figure 7 in the direction of the arrows.

Figure 9 is a diagrammatic view showing how radiations from an infrared source may be transmitted from a distance and concentrated on a cell, embodying our invention, for increasing the sensitivity thereof.

Referring to the drawing in detail, and first considering the embodiment of our invention illustrated in Figures 1 and 2, our cell 11 consists essentially of a soft metal backing 12, desirably of tin, covered with a layer 13 of a bismuth compound, such as the sulfide, ($Bi_2S_3$), and the selenide ($Bi_2Se_3$), which is in turn coated with a thin translucent film 14 of a conductor such as copper, silver, cadmium, carbon, bismuth, lead, tin, combination of two or more of the metals mentioned, or equivalent material.

Bismuth sulfide (or equivalent) of such a cell is a solid photo-element corresponding to the cuprous oxide or selenium of the rectifier type of photocell. Such a cell generates its own power under the influence of radiations, without the external application of electromotive force. Both the direction of response and the efficiency of such a photocell, are dependent on the characteristics of the photosensitive material which might be described as a semi-conductor.

The distinguishing feature of our cell, is that it is sensitive to energy in the infrared out to a threshold wave length of 70,000 Angstrom units. By comparison, the selenium cell is sensitive to energy out to 8,000 Angstrom units, caesium to 15,000 Angstrom units, and cuprous oxide to 14,000 Angstrom units.

Although it is possible to detect infrared radiations having wave lengths of 15,000 Angstrom units by means of a thermopile, which is a very expensive and delicate instrument, our invention makes direct reading of the long wave length infrared radiations cheap and practical.

The bismuth sulfide layer 13 may be about .005 inch in thickness, although thicker films have been used. It is applied to the tin backing 12 under high pressure, such as about fifty tons per square inch. Other metals besides tin may be employed if desired, but tin has been found satisfactory. We prefer to make the bismuth sulfide by chemical precipitation with hydrogen sulfide from acid solution, avoiding an excess of bismuth or sulfur. Such procedure is well known to all chemists. An acid treatment after preparation has been found desirable. We have, however, tried other methods of preparation, but the one mentioned has given good results.

When the bismuth sulfide is firmly pressed into and onto the tin or other soft metal backing plate 12, the outer surface of the photolayer is covered with a thin layer of infrared transmitting electrical conducting material, and forms what has often been called the "translucent" layer 14. This coating is desirably done by electrolytic deposition from an acid sulfate of copper bath or by sputtering the material selected from the list previously given. As an alternative, it has been found satisfactory to rub a conducting very thin layer of graphite on the surface of the photo-layer 13. Such a coating is too thin to measure with a micrometer, and has been found to transmit about 20% of the radiation from an incandescent tungsten filament lamp, as measured by a selenium cell.

In order to connect a cell produced, as shown in Figure 2, with a measuring instrument such as a milliammeter 15, a ring 16 of metal or other conducting material is desirably applied, as shown, in engagement with the translucent layer 14, in order to make good contact therewith, and the instrument 15 connected between said ring 16 and the soft metal base, as by leads 17 and 18.

The electrical resistances of cells, produced in accordance with our invention, have been found to vary considerably. That is, they may be as low as 75 ohms and as high as 15,000 ohms, depending on the thickness of bismuth sulfide, the method of preparation, and the kind of contacts made to it.

In order to make good contact, a metallic layer may be sputtered or electrically deposited, as indicated at 14 in Figure 1, and in order to cut down the cell resistance, multiple contacts may be made with the translucent layer 14 by a grid-like structure 19 connected to a peripheral ring $16^a$, like the ring 16 of Figures 1 and 2, as shown in Figure 3.

Figure 4 illustrates a further embodiment of our invention in which the metal backing plate $12^b$ is in the center, and both surfaces are coated with layers $13^b$ of bismuth sulfide, the outer surfaces of which layers are then, in turn, each coated with a translucent conducting film $14^b$. The films are then desirably connected in parallel, as by means of conductor 21, through connecting rings $16^b$ and the milliammeter or other indicating instrument may be connected to this duplex cell by leads $17^b$ and $18^b$ from one of the rings $16^b$ and the metal plate $12^b$, as illustrated.

For convenience in measuring, a null reading or compensated cell may be constructed, as shown in Figure 5, that is, two equivalent photoelectric cells $11^c$ and $11^d$ may be made, as in Figure 1, mounted on a suitable base 20, and balanced against one another through a resistance 22 and milliammeter or other sensitive measuring instrument 23. After they have been both exposed to the same amount and kind of radiation, and balanced against one another, then the connections may be changed to make them act together, the output from one cell being then determined as one-half that of both, then the output from one of the cells may be balanced by a known electromotive force, as is usual with such devices.

Figure 6 illustrates a form of cell $11^e$ constructed as shown in Figures 1 and 2, and adjustably mounted in a box 24, where it may be employed with or without a filter 25, for measuring infrared radiations 26. The cell $11^e$ consists of a soft metal base $12^e$, a photosensitive layer of bismuth sulfide $13^e$, and a translucent or thin infrared-transmitting electrical conducting layer $14^e$. Contact is made with the latter through a graphite front contact 27, mounted on a resilient conducting strap 28, extending from a binding post 29. A set screw 30, holds the cell tight and provides an electrical connection with the metal base $12^e$. Leads $17^e$ and $18^e$ extend, respectively, from the binding post 29 and screw 30, to the milliammeter or other measuring instrument, not shown.

The filter 25, shown covering the cell face in order to limit the range of infrared radiations to be detected, may be formed of "Pyrex" glass, which will pass infrared up to about 18,000 Angstrom units, heat transmitting glass which transmits rays between 8,000 and 40,000 Angstrom units, or hard rubber which is a good transmitter of heat rays.

It is also desirable, in many cases, to enclose the cell in order to protect it from fumes, dust or other deteriorating action, in which case any infrared transmitting substance may be used over the front face, such as one of the filters given above, and hermetically sealed to the box.

As it is desired to avoid heat from extraneous sources, which might vitiate the results, the box 24 enclosing the cell is desirably formed of heat-insulating material, such as Celotex.

In infrared signalling, a highly directional effect is often desired. In such a case, a shield 31 of insulating and heat absorbing material may be used with a box $24^f$ holding a bismuth sulfide cell $11^f$, as shown in Figures 7 and 8. In this case the front contact $27^f$ is provided by the box itself, and the back contact by the set screw $30^f$ which engages the metal backing plate $12^f$. The box $24^f$ may be provided with a pocket $25^f$ for the reception of a filter, like the filter 25 of Figure 6, if desired.

As an example of how directional effects may be obtained, which also amplify the readings of a cell embodying our invention, Figure 9 shows a source 32 of infrared radiations, such as a Nernst glower, a heated platinum ball, or a low temperature projection lamp, mounted at the focus of the sending device 33, which is shown in the form of a parabolic reflector.

A bismuth sulfide cell $11^g$, constructed in accordance with our invention, is mounted at the focus of a receiving device 34, which is also shown in the form of a parabolic reflector, the sensitive surface facing inward or toward the reflecting surface of the device 34. In this way the energy is transmitted from the sending device to the receiving device without much loss, and focused on the cell which is then in a position to efficiently record the radiations.

Tests of bismuth sulfide cells, constructed in accordance with our invention, show that they have good stability, small fatigue, slow response, and a conductivity which is only slightly asymmetric. The current produced is roughly proportional to the area exposed, inversely proportional to the square of the distance from the light source, and both current and voltage are directly proportional to the wattage of the light source.

The degree of sensitivity and stability varies a great deal from cell to cell, largely due to variations bound to occur in construction and more or less accidental characteristics. The silver-electroplated bismuth sulfide cell which had a poor response, showed a relatively high unipolar conductivity. The ratio of the conductivity in opposite directions was ten to one. In the cases of the higher sensitivity cells, it was around two to one, although this was not instantaneous, that is, the resistance started out about the same as for other cells, but would then drift down if the current was in one direction and up if it were in the other.

The bismuth sulfide cell in which the outer conducting or translucent layer was formed by evaporating Wood's metal thereon, showed good asymmetric conductance and the only near-instantaneous current response observed for any of such cells.

The experimental bismuth sulfide cells we made were not so photosensitive as the selenium cell for radiations from an incandescent tungsten lamp or from the sun. Also, they were not so good as a sensitive thermopile for infrared radiations. They are much cheaper, however, than a thermopile. A cell produced in accordance with our invention can, for example, be used to indicate the amounts of energy radiated from black bodies at low temperatures. Thus radiations from a flat iron heated to about 450° C. gave fifty microamperes when the iron was disposed 5 cm. from the cell.

Photovoltaic cells produced in accordance with our invention should find numerous practical applications in controlling furnaces, detecting signals in fog, burglar alarms, automatic fire signals, sprinkler systems, chemical reaction control device, and in any place where it is desired to control relatively low temperatures. Although the cells which we have experimented with have had areas of about 1.2 square inches, it is possible to produce cells of almost any desired surface area. The thickness of the backing metal is not critical, but should be great enough to stand having the sensitive coating pressed thereinto and properly rigidify the cell. The great advantage of our cells, over other means for detecting infrared radiations, is that they may be constructed at small expense, while the total photoelectric sensitivity compares favorably with that of the vacuum tube photoelectric cells, being much greater than that of the sodium, and about the same as that of the caesium cell.

Although preferred embodiments of our invention have been disclosed, it will be understood that modifications may be made within the spirit and scope of the appended claims which are not all limited to bismuth sulfide, as another compound of bismuth, such as the selenide, may be substituted.

We claim:

1. A photovoltaic cell having about 80% of its photoactivity in the infrared region and comprising a conducting base, a layer of material selected from the group consisting of bismuth sulfide and bismuth selenide thereover, and a thin translucent electrically conducting film over said layer.

2. A photovoltaic cell sensitive to infrared radiations shorter than 70,000 Angstrom units and comprising a conductive base, a layer of material selected from the group consisting of bismuth sulfide and bismuth selenide thereover, and a thin translucent electrically conductive film over said layer.

3. A photovoltaic cell having about 80% of its photoactivity in the infrared region and comprising a tin base, a layer of bismuth sulfide thereover, and a thin translucent layer of metal selected from the group consisting of copper, silver, cadmium, bismuth, lead, tin and combinations of two or more of such metals deposited thereon.

4. A photovoltaic cell having 80% of its photoactivity in the infrared region of the spectrum and comprising a conducting base, a layer of bismuth sulfide, and a thin translucent electrically conducting film over said layer.

5. A photovoltaic cell having about 80% of its photoactivity in the infrared region and comprising a conducting base, a layer of bismuth sulfide thereover, a thin translucent electrically conducting film deposited on said layer, and a contact ring engaging said layer.

6. A photovoltaic cell having about 80% of its photoactivity in the infrared region and comprising a conducting base, a layer of bismuth sulfide thereover, an electrically conductive translucent film on said layer, and an electrical conductive grid engaging said film for increasing the conductance of said layer.

7. A photovoltaic cell comprising a conducting base, a layer of bismuth sulfide pressed into each face of said base, and a translucent film of electrically conducting material disposed over each layer.

COLIN G. FINK.
JOHNSTONE S. MACKAY.